United States Patent [19]

de Launay

[11] 4,256,137
[45] Mar. 17, 1981

[54] CHECK VALVE

[76] Inventor: Paul de Launay, 119 W. Farrell, Lafayette, La. 70508

[21] Appl. No.: 21,505

[22] Filed: Mar. 19, 1979

[51] Int. Cl.³ ............................................. F16K 15/02
[52] U.S. Cl. ............................... 137/496; 137/516.29; 137/538
[58] Field of Search ........... 137/469, 494, 496, 516.25, 137/516.27, 516.29, 538

[56] References Cited

U.S. PATENT DOCUMENTS 2,655,173  10/1953  Overbeke .......................... 137/494 X

FOREIGN PATENT DOCUMENTS 756162  8/1956  United Kingdom ...................... 137/538

Primary Examiner—Robert G. Nilson
Attorney, Agent, or Firm—Guy E. Matthews

[57] ABSTRACT

A check valve for use in a flow line has a valve body which includes a first portion with an inlet and an outlet, the inlet and outlet being substantially aligned with one another. The valve body further includes a second portion with tubular member having an longitudinal passage for receiving fluid from the inlet passage with outlet ports extending radially from the longitudinal passage and with a flange member extending annularly around tubular member. A plunger is mounted with the valve body for preventing fluid flow through the outlet ports and includes a plug mounted with the tubular member in its longitudinal passage to deflect the flow of fluid through the outlet ports and a tubular sleeve circumscribes the tubular member. The spring is mounted with the valve body for urging the plunger toward the inlet passage. The flow of fluid through the valve is checked when the pressure in the inlet passage is insufficient to overcome the urging of the spring.

14 Claims, 4 Drawing Figures

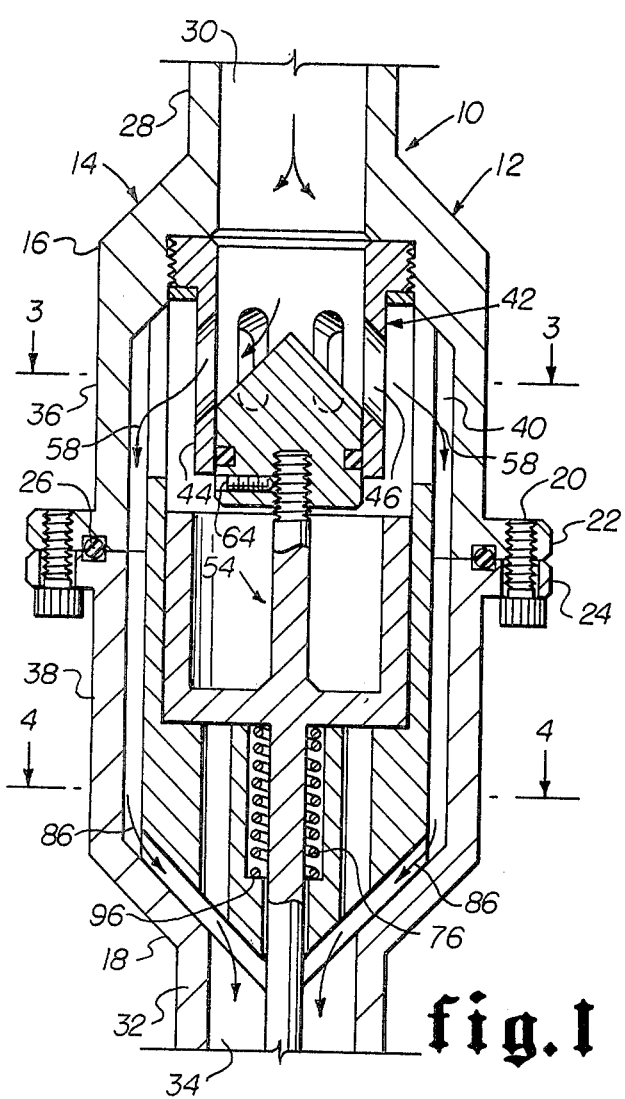
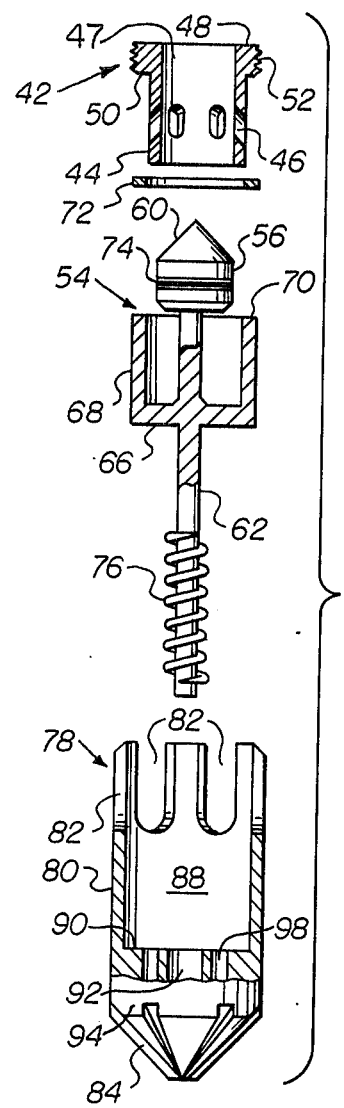
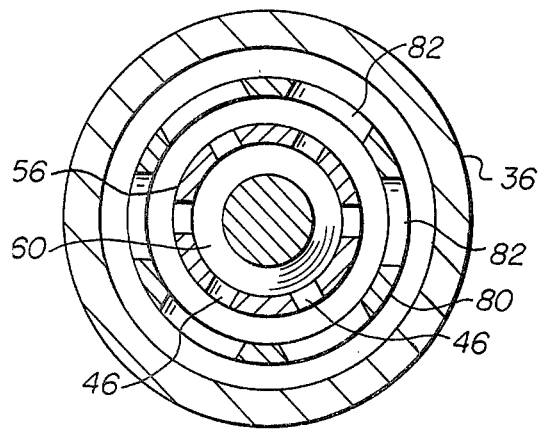
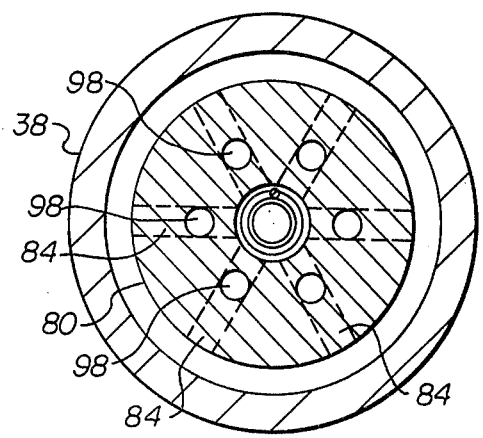

CHECK VALVE

CROSS-REFERENCE TO RELATED APPLICATIONS

This application relates to a copending application having Ser. No. 838,148, filed on Sept. 30, 1977, and entitled "Check Valves", now U.S. Pat. No. 4,176,680.

BACKGROUND AND BRIEF SUMMARY OF THE INVENTION

Check valves are commonly used in flow lines to permit the flow of fluid in one direction while stopping flow in an opposite direction. A typical prior art check valve permits the fluid to flow directly over a sealing surface located on the check valve. Thus, the sealing surface becomes eroded by the fluid action and expensive procedures; such as, removal of the valve from the flow line and machining the sealing surface to repair the valve or replacing the valve in the flow line, are necessary to insure that the check valve functions properly.

Recently, a check valve was disclosed in copending application Ser. No. 838,148, now U.S. Pat. No. 4,176,680, and including a body having a first portion defining an inlet passage, an outlet passage and a shoulder for directing fluid flow upwardly through an opening into the outlet passageway and having a second portion with a tubular section threadably engaged in the opening for receiving the flowing fluid in one end and then out outlet ports and a flange extending outwardly from the tubular portion at a location below the outlet ports to define an upwardly facing sealing surface. A plunger member was mounted within the body and included a plug slidably mounted within the longitudinal passage and a sleeve mounted to circumscribe the longitudinal section, the sleeve having a shoulder forming a downwardly facing sealing surface which was engagable with the upwardly facing sealing surface on the flange. The sleeve was moved upwardly by the pressure exerted from the fluid on the plug. A spring was mounted with the plunger member to urge the downwardly facing sealing surface into engagement with the upwardly facing sealing surface to thereby prevent fluid communication between the inlet and outlet passageways by stopping fluid flow into the outlet ports when the pressure of the fluid within the inlet passageway is insufficient to overcome the force provided by the spring.

In accordance with the present invention, a check valve is used in a flow line and comprises a valve body including a first portion having an inlet with a passage for carrying fluid from the flow line and an outlet with a passage for carrying the fluid back to the flow line, the inlet and outlet passages being substantially aligned with one another. The valve body further includes a second portion having a tubular member with a longitudinal passage for receiving fluid from the inlet passage and with outlet ports extending radially from the longitudinal passage. A flange extends annularly around the tubular member with a surface spacing the outlet of the first portion. A plunger is mounted with the valve body for preventing fluid flow through the outlet ports of the tubular member and includes a plug mounted with the tubular member in the longitudinal passage for deflecting the flow of fluid out of alignment with the inlet passage and through the outlet ports and further includes a tubular sleeve circumscribing the tubular member with an engaging shoulder facing the flange surface. A spring is mounted with the valve body for urging the plunger toward the inlet passage. The plug thus moves through the longitudinal passage of the tubular member and the shoulder of the tubular member moves toward the flange surface when the pressure of the fluid in the inlet passage is insufficient to overcome the urging of the spring which thereby checks the flow of fluid through the valve.

BRIEF DESCRIPTION OF THE DRAWINGS

Other objects and advantages of the invention will become apparent upon reading the following detailed description and upon reference to the drawings, in which like reference characters are used throughout to designate like parts:

FIG. 1 is an elevational view, partly in section, an embodiment of a check valve constructed according to the present invention;

FIG. 2 is an exploded elevational view, partly in section, of a portion of the check valve illustrated in FIG. 1;

FIG. 3 is a plan view of the invention shown in FIG. 1 taken in the direction of arrows 3—3; and FIG. 4 is a plan view of the invention illustrated in FIG. 1 taken in the direction of arrows 4—4.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning now to the drawings, a check valve 10, constructed according to the present invention, is generally illustrated in FIG. 1. Valve 10 is used in a flow line (not shown) and comprises a valve body 12 which includes a first portion 14 having an inlet section 16 joined to an outlet section 18 by bolts 20 extending through facing flanges 22 and 24 mounted with inlet and outlet sections 16 and 18, respectively. An O-ring seal 26 is disposed between the flanges to prevent fluid leaks.

Inlet section 16 has an inlet 28 with a passage 30 for carrying fluid from the flow line and outlet section 18 has a tubular outlet 32 with a passage 34 for carrying the fluid back to the flow line. As shown, the inlet and outlet passages are substantially aligned with one another and inlet section 16 and outlet section 18 include walls 36 and 38, respectively, supporting flanges 22 and 24, which have a greater diameter than inlet 28 and outlet 32 to thereby form a valve chamber 40.

Valve body 12 further includes a second portion 42 disposed within valve chamber 40 which has a tubular member 44 with a longitudinal passage 47 for receiving fluid from inlet passage 30 and with outlet ports 46 extending radially of longitudinal passage 46 and sloping inwardly toward inlet passage 30 of first portion 14. A flange 48 extends annularly around tubular member 44 with a surface 50 facing outlet 32 of first portion 14. Threads 52 are provided on the outer periphery of flange 48 for connecting second portion 42 to first portion 14.

A plunger 54 is mounted with valve body 12 and includes a plug 56 mounted in longitudinal passage 47 of tubular member 44 to deflect the flow of fluid out of alignment with inlet passage 30, as shown by arrows 58 in FIG. 1. Since outlet ports 46 are sloped inwardly toward inlet passage 30, plug 56 of plunger 54 has a conically shaped end portion 60 to aid in directing the incoming fluid from passage 30 toward outlet ports 46. A support shaft 62 is threaded to plug 56 and secured thereto by a set screw 64, and is disposed in valve body 10 so as to be in alignment with outlet passage 34. A circular disc 66 extends transversely from shaft 62 to form a cap and support for a tubular sleeve 68 which circumscribes tubular member 44. A shoulder 70 is provided on the outboard end of sleeve 68 for engaging with a sealing ring 72 mounted with flange 48 for preventing fluid passage between the shoulder of the tubular sleeve and flange surface 50 when the flow through said valve is checked. Also, a sealing ring 74 is mounted around the outer periphery of plug 56 for preventing fluid passage around plug 56 when mounted within passage 46 of tubular member 44.

A coil spring 76 is mounted with valve body 12 for urging plunger 54 toward and in alignment with inlet passage 30. Thus, plug 56 moves through longitudinal passage 47 of tubular member 44 and shoulder 70 of tubular sleeve 68 moves toward flange surface 50 when the pressure of the fluid in inlet passage 30 is insufficient of overcome the urging of spring 76 which thereby checks the flow of fluid through the valve.

Valve body 12 further includes a third portion 78 disposed within valve chamber 40 for supporting plunger 54. Third portion 78 includes a housing 80 with slots 82 for receiving fluid from outlet ports 46 of second portion 42. Housing 80 has channels 84 extending radially toward the axis of housing 12 to coact with walls 38 of first portion 14 to form passageways in fluid communication with outlet passage 34 to permit fluid flow therethrough as shown by arrows 86. Thus, the fluid flows from inlet passage 30, around housing 80 and into outlet passage 34 when the pressure in the inlet passage is sufficient to overcome the urging of spring 76. Housing 80 further has a cavity 88 for receiving tubular sleeve 86 of plunger 54 with its bottom 90 forming a shoulder which limits the distances that plug 56 of plunger 54 can move away from the inlet passage so that the sides of conical end 60 is positioned to insure flow through outlet ports 46. A countersunk passageway 92 extends axially through base 84 of housing 80 to permit support shaft 62 to extend axially therethrough into outlet passage 34. Passage 92 is countersunk to provide a shoulder 96 for receiving spring 76 therein which permits coil spring 76 to be compressed and act on cap 66 of plunger 54 to urge the plunger toward inlet passage 30. Also, passageways 98 are provided through base 94 of housing 80 for directing fluid against cap 66 of plunger 54 in the event of reverse flow through valve 10 as an aid in urging plunger 54 to the engaging position and thereby check the flow of fluid through the valve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiment may be made of the invention without departing from the scope thereof, it is to be understood that all matter herein set forth or shown in the accompanying drawing is to be interpreted as illustrative and not in a limiting sense.

The invention having been described, what is claimed is:

1. A check valve for use in flow line, comprising:
a valve body including
a first portion having
an inlet with a passage for
carrying fluid from the flow line and
an outlet with a passage for carrying fluid back to the flow line, the inlet and outlet passages being substantially aligned with one another, and
a second portion having
a tubular member with a longitudinal passage for receiving fluid from the inlet passage and with outlet ports extending radially from the longitudinal passage and
a flange extending annularly around the tubular member with a surface facing the outlet of said first portion;
a plunger mounted with said valve body for checking fluid flow through said valve, said plunger including
a plug mounted in the longitudinal passage of said tubular member and movable with said plunger from a first deflecting position wherein said plug deflects the flow of fluid out of alignment with the inlet passage and through said outlet ports to a second checking position wherein said plug sealingly checks flow through the valve; and
a tubular sleeve circumscribing said tubular member with an engaging shoulder; and
a spring mounted with said valve body for urging said plunger toward the inlet passage, the plug moving through the longitudinal passage of said tubular member and the shoulder of said tubular sleeve moving toward the flange surface when the pressure of the fluid in the inlet passage is insufficient to overcome the urging of said spring which thereby checks the flow of fluid through the valve.

2. The valve of claim 1, wherein said plunger includes a support shaft mounted with the plug in alignment with the outlet passage of said valve body, and a cap extending transversely of said support shaft for supporting the tubular sleeve therefrom, said spring being a coil spring mounted around the support shaft for acting on the cap to urge said plunger toward the inlet passage.

3. The valve of claim 1, including a sealing ring mounted around the plug of said plunger for preventing fluid passage between the plug and tubular member.

4. The valve of claim 1, including a sealing ring mounted with the flange for preventing fluid passage between the shoulder of the tubular sleeve and the flange surface when the flow through said valve is checked.

5. The valve of claim 1, wherein the outlet ports of said tubular member slope inwardly toward the inlet passage, and the plug of said plunger includes a conically shaped end portion to aid in directing the fluid toward the outlet ports.

6. The valve of claim 1, wherein the flange of said second portion is displaced from the outlet ports by a distance sufficient to inhibit erosion of the flange surface.

7. The valve of claim 1, wherein said valve body includes a third portion for supporting said plunger having a housing with slots for receiving fluid from said outlet port and with channels which coact with the first portion to form passageways in fluid communication with the outlet passage, the fluid flowing from said inlet passage around said housing and into the outlet passage when the pressure in the inlet passage is sufficient to overcome the urging of said spring.

8. The valve of claim 7, wherein the housing of said third portion has a cavity for receiving the tubular sleeve of said plunger, the bottom of the cavity forming a shoulder which limits the distance that the plug of said plunger can move away from the inlet passage.

9. The valve of claim 8, wherein said plunger includes a support shaft mounted with the plug in alignment with the outlet passage of said valve body, and a cap extending transversely of said support shaft for supporting the tubular sleeve therefrom; said spring being a coil spring mounted around the support shaft for acting between the cap and third portion to urge said plunger toward the inlet passage.

10. The valve of claim 9, wherein the third portion has passageways for directing fluid against the cap of said plunger in the event of reverse flow through the valves.

11. The valve of claim 10, including a sealing ring mounted around the plug of said plunger for preventing fluid passage between the plug and tubular member.

12. The valve of claim 11, including a sealing ring mounted with the flange for preventing fluid passage between the shoulder of the tubular sleeve and the flange surface when the flow through said valve is checked.

13. The valve of claim 12, wherein the outlet ports of said tubular member extend radially of the longitudinal passage and slope inwardly toward the inlet passage and the plug of said plunger includes a conically shaped end portion to aid in directing the fluid toward the outlet ports.

14. The valve of claim 13, wherein the flange of said second portion is displaced from the outlet ports by a distance sufficient to inhibit erosion of the flange surface.

* * * * *